(12) United States Patent
Oh et al.

(10) Patent No.: US 8,365,800 B2
(45) Date of Patent: Feb. 5, 2013

(54) BLIND WITH SOLAR BATTERIES AND CONTROL METHOD THEREOF

(75) Inventors: Jae Hyuk Oh, Seongnam-si (KR); See Young Choi, Suwon-si (KR); Seong Je Wu, Anyang-si (KR); Seong Joo Han, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 177 days.

(21) Appl. No.: 12/591,314

(22) Filed: Nov. 16, 2009

(65) Prior Publication Data
US 2010/0154999 A1 Jun. 24, 2010

(30) Foreign Application Priority Data
Dec. 22, 2008 (KR) ........................ 10-2008-0131498

(51) Int. Cl.
*E06B 9/32* (2006.01)
(52) U.S. Cl. ............... 160/168.1 P; 160/176.1 P; 160/7; 160/DIG. 17
(58) Field of Classification Search .... 160/166.1–178.3, 160/1–9, DIG. 17
See application file for complete search history.

(56) References Cited

U.S. PATENT DOCUMENTS

| | | | | |
|---|---|---|---|---|
| 3,490,515 A * | 1/1970 | Kandel | | 160/178.1 R |
| 3,809,143 A * | 5/1974 | Ipekgil | | 160/168.1 P |
| 4,137,098 A * | 1/1979 | Field | | 136/248 |
| 4,636,579 A * | 1/1987 | Hanak et al. | | 136/245 |
| 4,773,733 A * | 9/1988 | Murphy et al. | | 359/593 |
| 4,807,686 A * | 2/1989 | Schnebly et al. | | 160/84.02 |
| 4,841,672 A * | 6/1989 | Nebhuth et al. | | 49/25 |
| 4,856,574 A * | 8/1989 | Minami et al. | | 160/168.1 R |
| 5,040,585 A * | 8/1991 | Hiraki | | 160/188 |
| 5,142,133 A * | 8/1992 | Kern et al. | | 250/203.4 |
| 5,221,363 A * | 6/1993 | Gillard | | 136/248 |
| 5,258,076 A * | 11/1993 | Wecker | | 136/245 |
| 5,413,161 A * | 5/1995 | Corazzini | | 160/7 |
| 5,554,979 A * | 9/1996 | Kohar et al. | | 340/12.53 |
| 5,663,621 A * | 9/1997 | Popat | | 318/480 |
| 5,675,487 A * | 10/1997 | Patterson et al. | | 700/56 |
| 6,060,852 A * | 5/2000 | Domel et al. | | 318/480 |
| 2007/0175599 A1* | 8/2007 | Froese | | 160/168.1 R |

FOREIGN PATENT DOCUMENTS

JP 2004-27661 1/2004

* cited by examiner

*Primary Examiner* — David Purol
(74) *Attorney, Agent, or Firm* — Staas & Halsey LLP

(57) ABSTRACT

A solar battery is partially attached to each blade of a blind. The position of each blade is adjusted based on position information such that each blade tracks sunlight. Electric energy obtained by the generation of electricity using an indoor illumination source is used to charge a battery. In addition to the generation of electricity, some of the blades are folded to let in light.

18 Claims, 22 Drawing Sheets

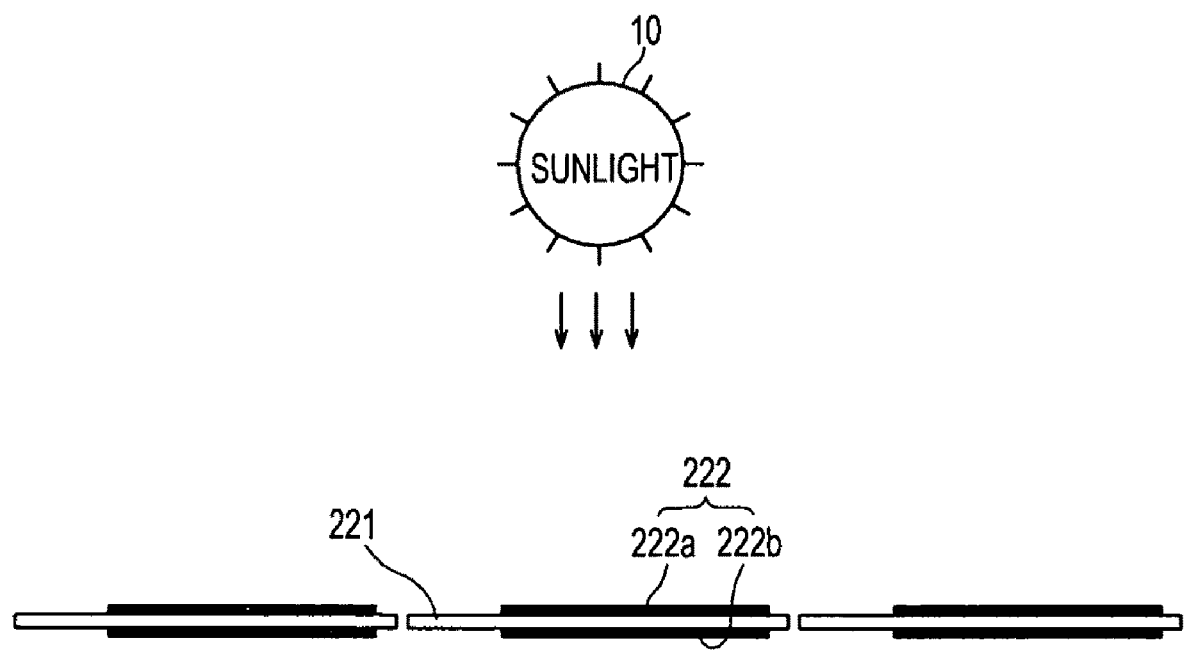

BLIND WITH SOLAR BATTERIES AND CONTROL METHOD THEREOF

CROSS-REFERENCE TO RELATED APPLICATIONS

This application claims the benefit of Korean Patent Application No. 2008-0131498, filed on Dec. 22, 2008 in the Korean Intellectual Property Office, the disclosure of which is incorporated herein by reference.

BACKGROUND

1. Field

The present invention generally relates to window blinds, and more particularly, to adjustable blinds driven by battery power.

2. Description of the Related Art

Interest in solar photovoltaic power generation systems is strong because these systems are environmentally-friendly, renewable energy sources.

As an example of the solar photovoltaic power generation system, research is in progress on a blind, disposed at a building window, having an electricity generation function to produce electric energy and a light blocking function to appropriately block direct rays of light.

In recent years, a scheme has been studied to increase the production of electric energy while reducing the installation area of solar batteries attached to a blind.

SUMMARY

Therefore, it is an aspect of the present invention to provide a blind with solar batteries and a control method thereof that are capable of reducing the area of the solar batteries, thereby reducing the manufacturing costs.

It is another aspect of the present invention to provide a blind with solar batteries and a control method thereof that are capable of adjusting the positions of blades such that the blades track to generate electricity, thereby improving the efficiency of electricity generation.

It is another aspect of the present invention to provide a blind with solar batteries and a control method thereof that are capable of generating electricity using an indoor illumination.

It is a further aspect of the present invention to provide a blind with solar batteries and a control method thereof that are capable of appropriately selecting an electricity generation function using the solar batteries and a lighting function.

Additional aspects and/or advantages of the invention will be set forth in part in the description which follows and, in part, will be apparent from the description, or may be learned by practice of the invention.

The foregoing and/or other aspects of the present invention are achieved by providing a blind, including: a plurality of blades configured to be adjusted in their positions; and solar batteries respectively attached to each of the blades.

The solar battery may be installed at a position of each blade except for a part where light is covered by the neighboring blades due to the use of the blades.

The blind may further include: a drive unit to drive the blades; a storage unit to store position information of the blades; and a controller to control the drive unit based on the position information.

The blind may further include an optical sensor installed at each blade.

The drive unit may include a motor and a connection member operatively connected to the motor to move the respective blades.

The foregoing and/or other aspects of the present invention may be achieved by providing a blind, including: a plurality of blades, each of the blades having a horizontally adjustable position, each of the blades having a solar battery attached thereto; a drive unit to adjust the horizontal positions of the blades; and a controller to control the drive unit such that the solar batteries track sunlight.

The solar battery may be installed at a position of each blade except for a part where light is covered by the neighboring blades due to the use of the blades.

The blind may further include a storage unit to store position information to adjust the horizontal positions of the blades.

When generation of electricity using the sunlight is not possible, the controller may control the horizontal position of each blade to be adjusted such that the solar battery attached to one side of each blade is directed to an indoor illumination.

The foregoing and/or other aspects of the present invention may also be achieved by providing a blind, including: a plurality of blades, each of the blades having a horizontally adjustable position, each of the blades having a solar battery attached thereto; a drive unit to adjust the vertical positions of the blades; and a controller to control the drive unit such that the solar batteries track sunlight.

The solar battery may be installed at a position of each blade except for a part where light is covered by the neighboring blades due to the use of the blades. The solar battery may be installed at each side of each blade. The blind may further include blocking units to block light entering between the respective blades. The blind may further include a storage unit to store position information to adjust the vertical positions of the blades.

The foregoing and/or other aspects of the present invention may be achieved by providing a blind, including: a plurality of blades, each of the blades having a vertically adjustable position, each of the blades having a solar battery attached thereto; a drive unit to adjust the horizontal and vertical positions of the blades; and a controller to control the drive unit such that the solar batteries track sunlight.

The drive unit may include a plurality of motors to adjust the horizontal and vertical positions of the blades, the motors being individually driven.

The blind may further include: a support unit to support one side of each blade; and a lighting motor to drive the support unit to fold some of the blades.

The foregoing and/or other aspects of the present invention may also be achieved by providing a control method of a blind, including: retrieving position information necessary for a plurality of blades configured to be adjusted in their horizontal or vertical positions, each blade having a solar battery attached thereto, to track sunlight; and adjusting the horizontal or vertical positions of the blades based on the position information.

The control method may further include finely adjusting the horizontal or vertical positions of the blades based on an output of an optical sensor after adjusting the positions of the blades.

The control method may further include, when generation of electricity using the sunlight is not possible, adjusting the positions of the blades such that the solar batteries attached to the blades are directed to an indoor illumination.

The control method may further include: when the blades are configured to be adjusted in their vertical positions, attaching solar batteries to both sides of each blade; and, when adjusting the positions of the blades, controlling the front solar battery and the rear solar battery to track the sunlight in order.

The control method may further include folding some of the blades to let in light.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 7A to 7C are views illustrating the operation of the vertical type blind of FIG. 6A;

DETAILED DESCRIPTION OF EMBODIMENTS

Figure 1:
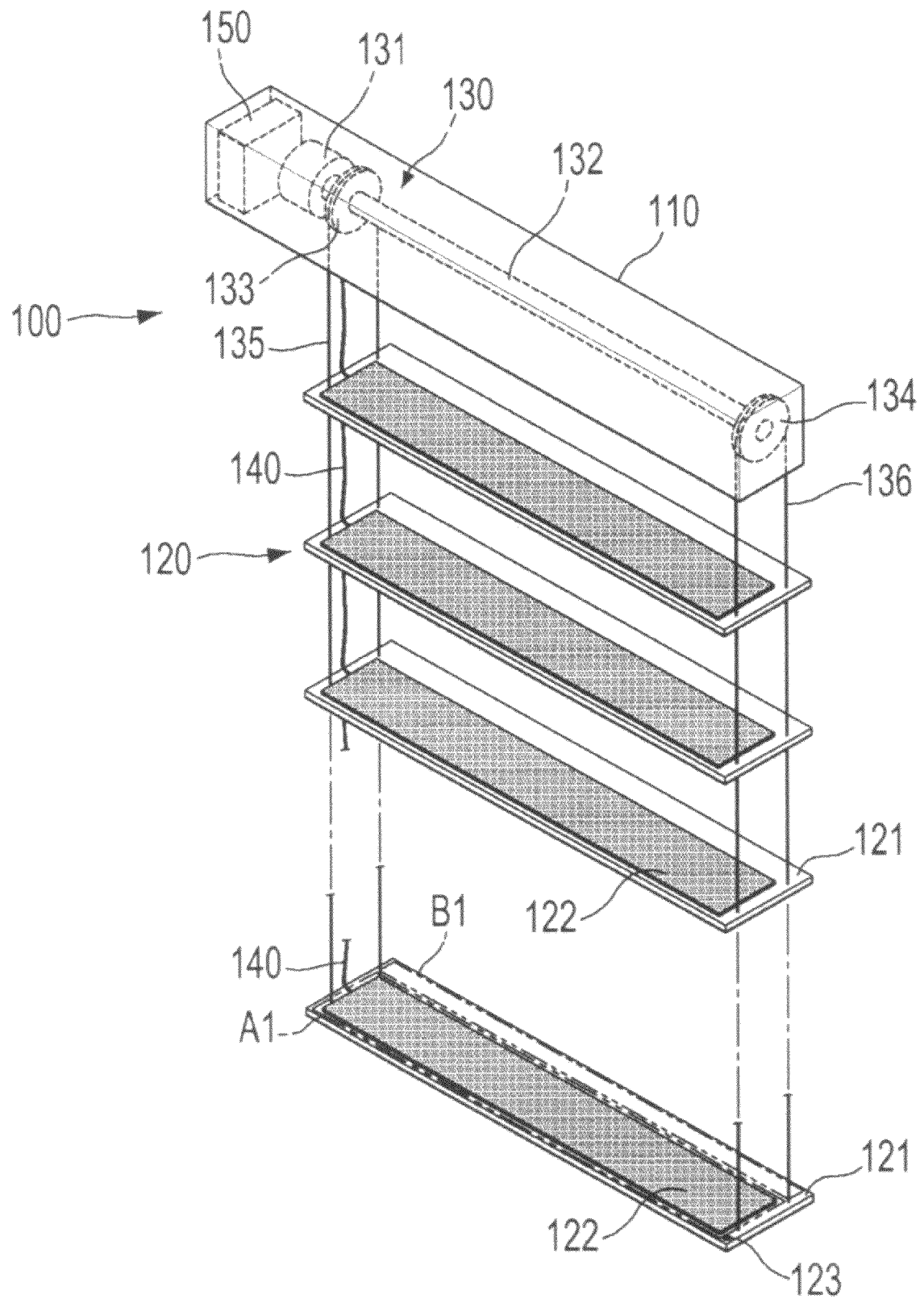
FIG. 1 is a perspective view illustrating the structure of a blind with solar batteries according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a perspective view illustrating the structure of a blind 100 with solar batteries according to an embodiment of the present invention.

In this embodiment, the blind 100 includes horizontal type blades 120 arranged in parallel in the horizontal direction and a support unit 110 to support the blades 120.

Each blade 120 has a solar battery 122 attached to a plate 121. The solar battery 122 is attached to a portion of the plate 121. Consequently, the plate 121 has an attachment area A1 and a non-attachment area B1 at one major surface thereof.

In the support unit 110 are disposed a drive unit 130 to vertically move the blades 120 and a control box 150. The control box 150 includes a manipulation panel necessary to set a user's command or operate a system.

The drive unit 130 includes a motor 131 configured to rotate in opposite directions, a rotary rod 132 integrally coupled to a shaft of the motor 131 such that the rotary rod 132 can be rotated, rotary rings 133 and 134 fixed to one side and the other side of the rotary rod 132, and adjustment strings 135 and 136 to connect the rotary rings 133 and 134 to one side and the other side of each plate 121, respectively.

The rotary ring 133 is operatively connected to the motor 131 such that the rotary ring 133 can be rotated. According to the rotation direction of the rotary ring 133, the plates 121 connected to the adjustment strings 135 and 136 are pulled or loosened. For example, when the adjustment string 135 pulls one side of each plate 121 by the rotation of the rotary rod 132, the other adjustment string 136 also pulls the other side of each plate 121 in the same direction. As a result, the plates are inclined simultaneously, and therefore, the horizontal positions of the plates are adjusted.

Reference numeral 123 indicates an optical sensor, and reference numeral 140 indicates a power cable to electrically interconnect the solar batteries attached to the respective blades. The power cable serves to supply electric energy to an electric energy storage unit and an electric load, which will be described later.

The ratio of the attachment area A1 to the non-attachment area B1 of each plate 121 is appropriately set. When the size of the attachment area A1 is increased, it is possible to enlarge the solar battery, but the costs increase. On the other hand, when the size of the non-attachment area B1 is increased, it is possible to decrease the costs, but the size of the solar battery decreases, with the result that the amount of electricity generated is reduced. The non-attachment area B1 is set considering a portion where light is covered by the neighboring blade. The non-attachment area B1 is a portion which is shadowed for a major portion of time and therefore is not suitable to the generation of electricity.

The setting of the ratio of the attachment area A1 to the non-attachment area B1 will be described in detail.

Figure 2:
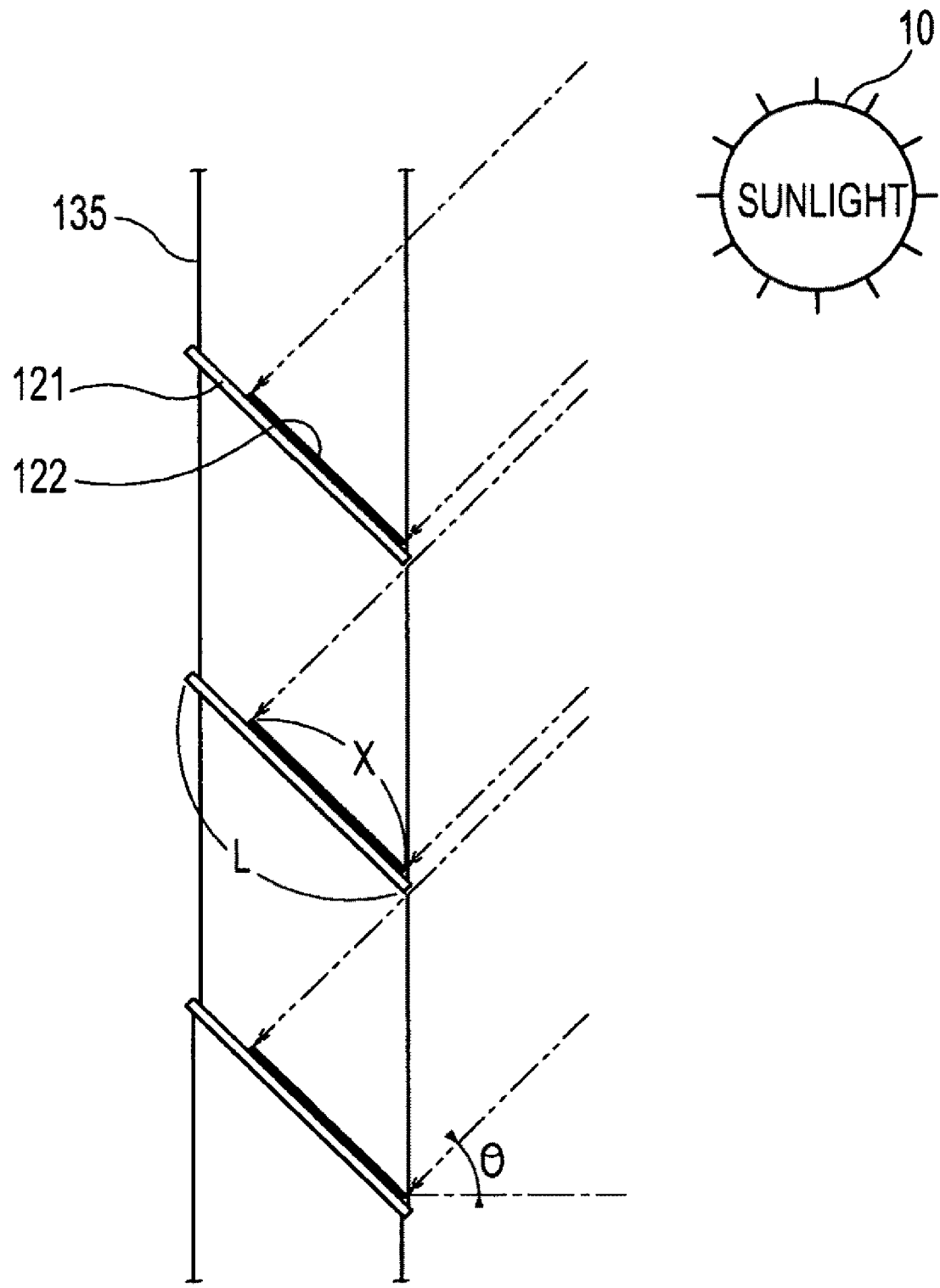
FIG. 2 is a view illustrating the operation of the horizontal type blind of FIG. 1.

Referring to FIG. 2, when an inclination θ of each plate 121 is located at meridian altitude in a region concerned, the front of the plate is directed in the direction normal to sunlight 10. At this time, light is covered by the neighboring plate at a portion of each plate. That is, the sunlight is not directly incident on the upper part corresponding to a difference (L−x) between the lateral length L of each plate and the lateral length x of the solar battery. The solar battery is not installed at the portion where light is covered.

When the sunlight 10 is incident on the solar battery 122 in the normal direction, the photoelectric conversion efficiency is the highest. In this embodiment, a portion where the sunlight is not covered when the inclination of each plate is located at meridian altitude is set as the attachment area A1. A portion where the sunlight is covered by each plate is set as the non-attachment area B1.

In this embodiment, information on meridian altitude in a region concerned is stored, and information of the inclination of each plate is acquired when necessary.

Figure 3:
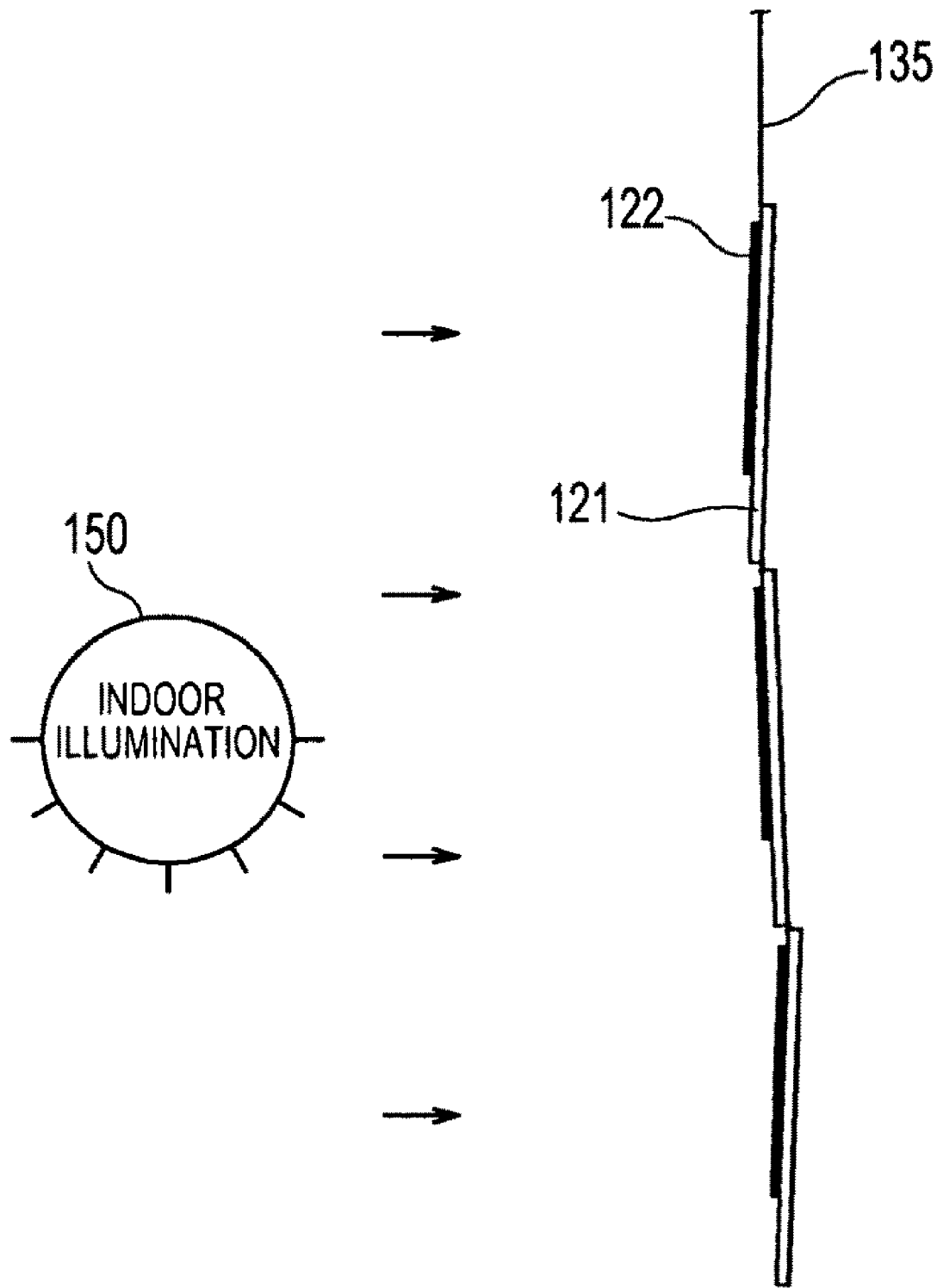
FIG. 3 is a view illustrating the operation of the horizontal type blind of FIG. 1 in a rear mode.

The generation of electricity using sunlight is difficult at night or in cloudy weather. In consideration of this, as shown in FIG. 3, the front of each plate 121 is directed to the rear where an indoor illumination 150 is located, and the rear of each plate 121 is directed frontward. Since the solar battery 122 attached to the front of each plate faces the indoor illumination 150, it is possible for the solar battery 122 to generate electricity using the indoor illumination 150. Electric energy obtained by the generation of electricity may be used to charge a rechargeable battery.

Figure 4:
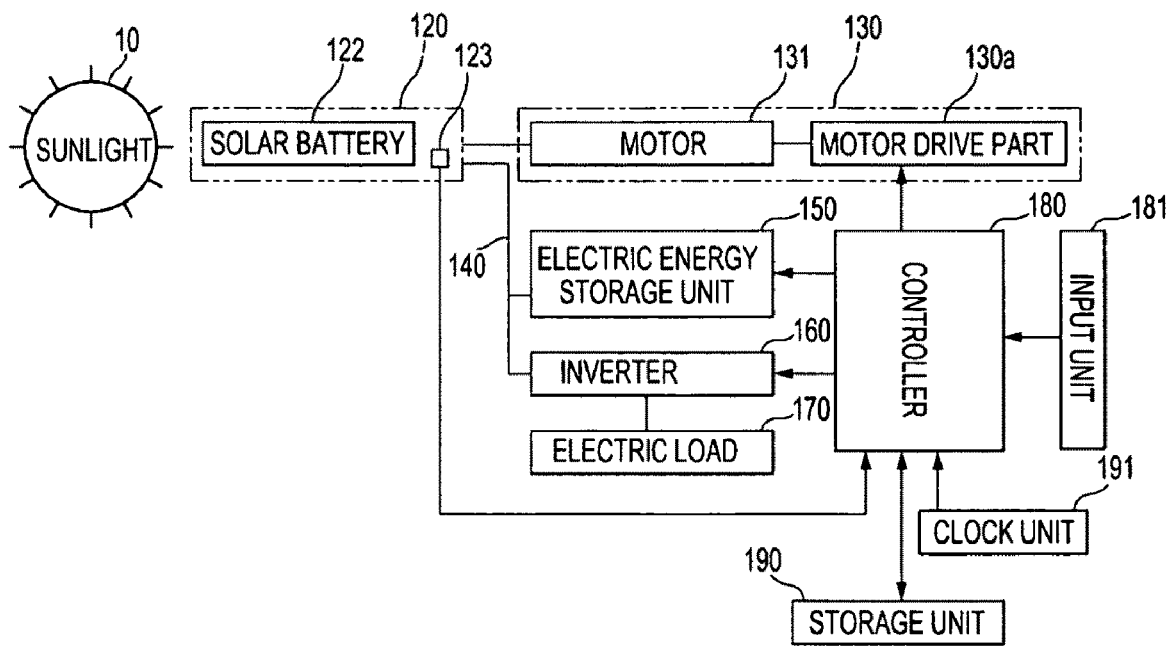
FIG. 4 is a control block diagram of the blind with solar batteries of FIG. 1.

FIG. 4 is a control block diagram of the blind with solar batteries of FIG. 1.

As shown, the blind includes a controller 180 to control the generation of electricity using the solar batteries.

An input unit 181 allows a user to input a command. A clock unit 191 provides the current time information. A storage unit 190 stores blade position information including meridian altitude in a region concerned. The optical sensor 123 provides an output value corresponding to the intensity of light to the controller 180. The drive unit 130 includes the motor 131 and a motor drive part 130a. The motor drive part 130a rotates the motor in the forward direction or in the reverse direction according to the control of the controller 180.

According to this embodiment, the controller 180 controls the blades 120 to be positioned in the horizontal direction such that the solar batteries 122 track sunlight to generate electricity using the position information retrieved from the storage unit 190.

Direct-current electric energy generated by the respective solar batteries 122 is supplied to an electric energy storage unit 150 and an inverter 160 connected to the power cable 140. The electric energy storage unit 150 includes a rechargeable battery configured to be charged with the provided electric energy. The inverter 160 converts the direct-current electric energy into alternating-current power, which is supplied to an electric load 170. The electric load may be an appliance that normally uses commercial alternating-current power.

The controller 180 may control the electric energy obtained by the solar photovoltaic power generation to the electric energy storage unit 150 and/or the inverter 160. For example, at normal times, the batteries are charged from the electric energy storage unit 150. When power supplied to the electric load 170 is insufficient at this state, the controller 180 controls the inverter 160 to supply commercial alternating-current power to the electric load 170.

Figure 5:
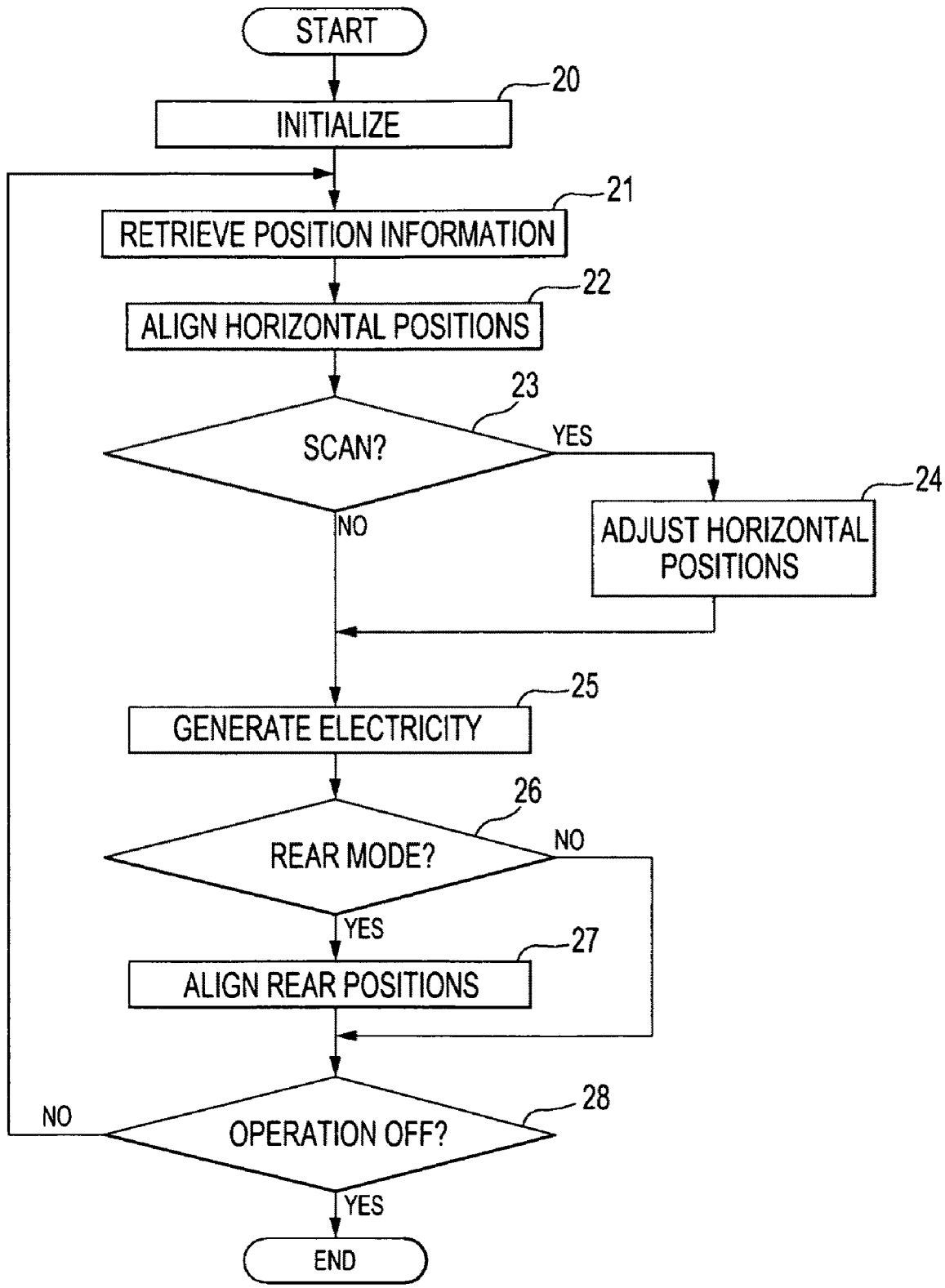
FIG. 5 is a flow chart illustrating a control method of the blind shown in FIG. 1.

FIG. 5 is a flow chart illustrating a control method of the blind shown in FIG. 1.

When power is supplied, the controller 180 controls an initialization operation to be performed according to an operation program. The initialization operation is an operation to arrange the horizontal type blades 120 to be placed at their initial positions (20). After the completion of the initialization operation, the controller 180 retrieves the storage unit 190 to retrieve position information to adjust the horizontal positions of the blades by time zones from sunup to sundown (21). The controller 180 controls the motor drive part 130a based on the current time provided from the clock unit 191 and the retrieved position information. As a result, the horizontal positions of the horizontal type blades 120 are aligned (22). Subsequently, scanning is performed to finely adjust the aligned positions. The scanning is a process to move the blades to a position where the output of the optical sensor 123 is maximum (23) (24). After the completion of the position adjustment, the solar batteries 122 generate electricity (25).

When the operation is performed at a rear mode, during the solar photovoltaic power generation, the front of each plate 121 is arranged to face the inner illumination 150, and the solar batteries 122 generate electricity through the inner illumination (26) (27).

The controller 180 determines whether the operation is off (28). When it is determined that the operation is off, the generation of electricity is interrupted, and the procedure ends. When it is determined that the operation is not off, the procedure returns to operation 21 to continue the solar photovoltaic power generation.

Figure 6A:
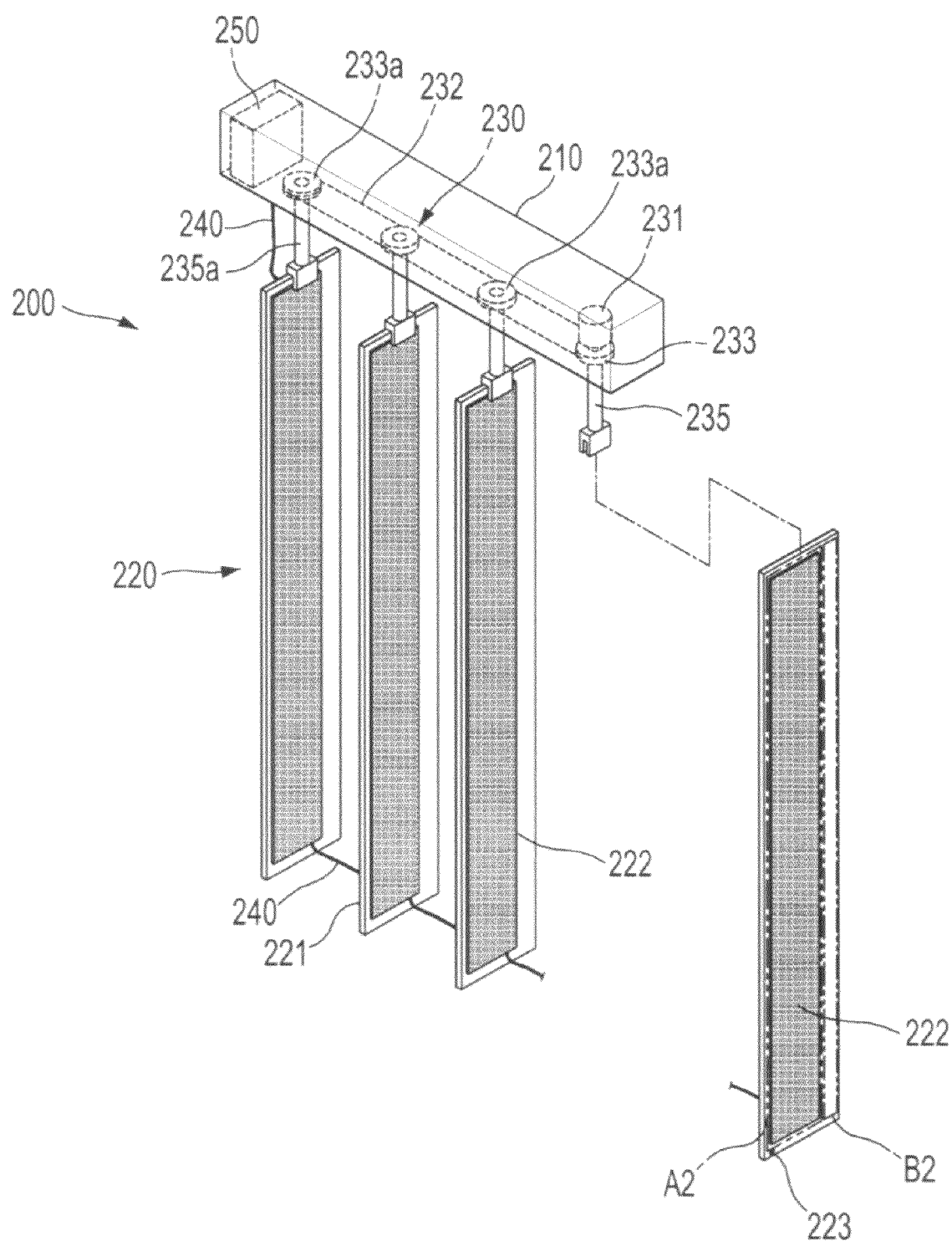
FIG. 6A is a perspective view illustrating the structure of a blind with solar batteries according to another embodiment of the present invention.

As shown in FIG. 6A, a blind 200 according to another embodiment of the present invention includes vertical type blades 220 arranged in parallel in the vertical direction and a support unit 210 to support the blades 220.

Each blade 220 has a solar battery 222 attached to a portion of a plate 221. The solar battery 222 is attached to an attachment area A2 but not to a non-attachment area B2. A technical concept to attach the solar battery to a portion of the plate is the same as in the previous embodiment.

In the support unit 210 are disposed a drive unit 230 and a control box 250.

The drive unit 230 includes a motor 231 configured to rotate in opposite directions, a main rotary shaft 235 integrally coupled to a shaft of the motor to rotate any one of the blades, a main rotary ring 233 fixed to the main rotary shaft 235, auxiliary rotary shafts 235a to support the other blades not coupled to the main rotary shaft, auxiliary rotary rings 233a fixed to the respective auxiliary rotary shafts 235a, and a connection chain 232 to connect the main rotary ring 233 and the auxiliary rotary rings 233a such that the main rotary shaft and the auxiliary rotary shafts operate together.

The main rotary ring 233 is rotated by the motor 231. According to the rotation direction of the main rotary ring 233, the auxiliary rotary rings 233a are rotated in the same direction by the connection chain 232. As a result, the plates 221 move to the left or to the right.

Reference numeral 223 indicates an optical sensor, and reference numeral 240 indicates a power cable.

Figure 6B:
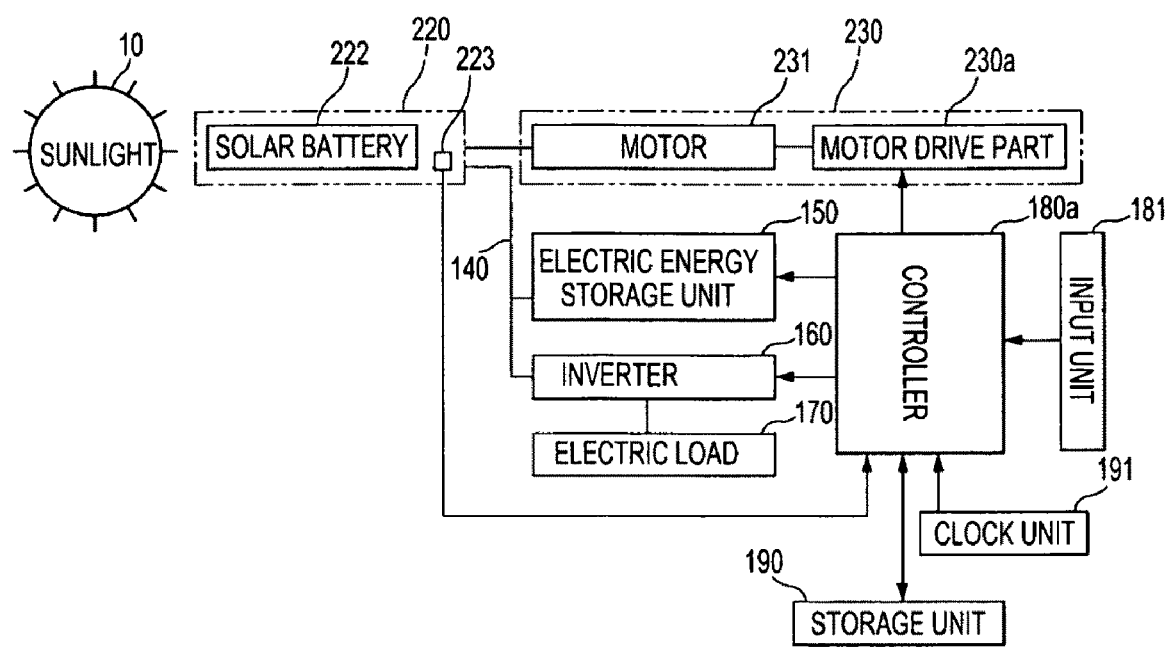
FIG. 6B is a control block diagram of the blind with solar batteries of FIG. 6A.

Referring to FIG. 6B, the blind according to this embodiment includes a controller 180a to control the generation of electricity using the solar batteries. Components of this embodiment identical to those of the previous embodiment are denoted by the same reference numerals, and will be described briefly.

The drive unit 230 includes the motor 231 configured to rotate in opposite directions and a motor drive part 230a. The motor drive part 230a rotates the motor in the forward direction or in the reverse direction according to the control of the controller 180a.

According to this embodiment, the controller 180a controls the blades 120 to be positioned in the vertical direction such that the solar batteries 222 track sunlight to generate electricity using position information retrieved from a storage unit 190.

Figure 6C:
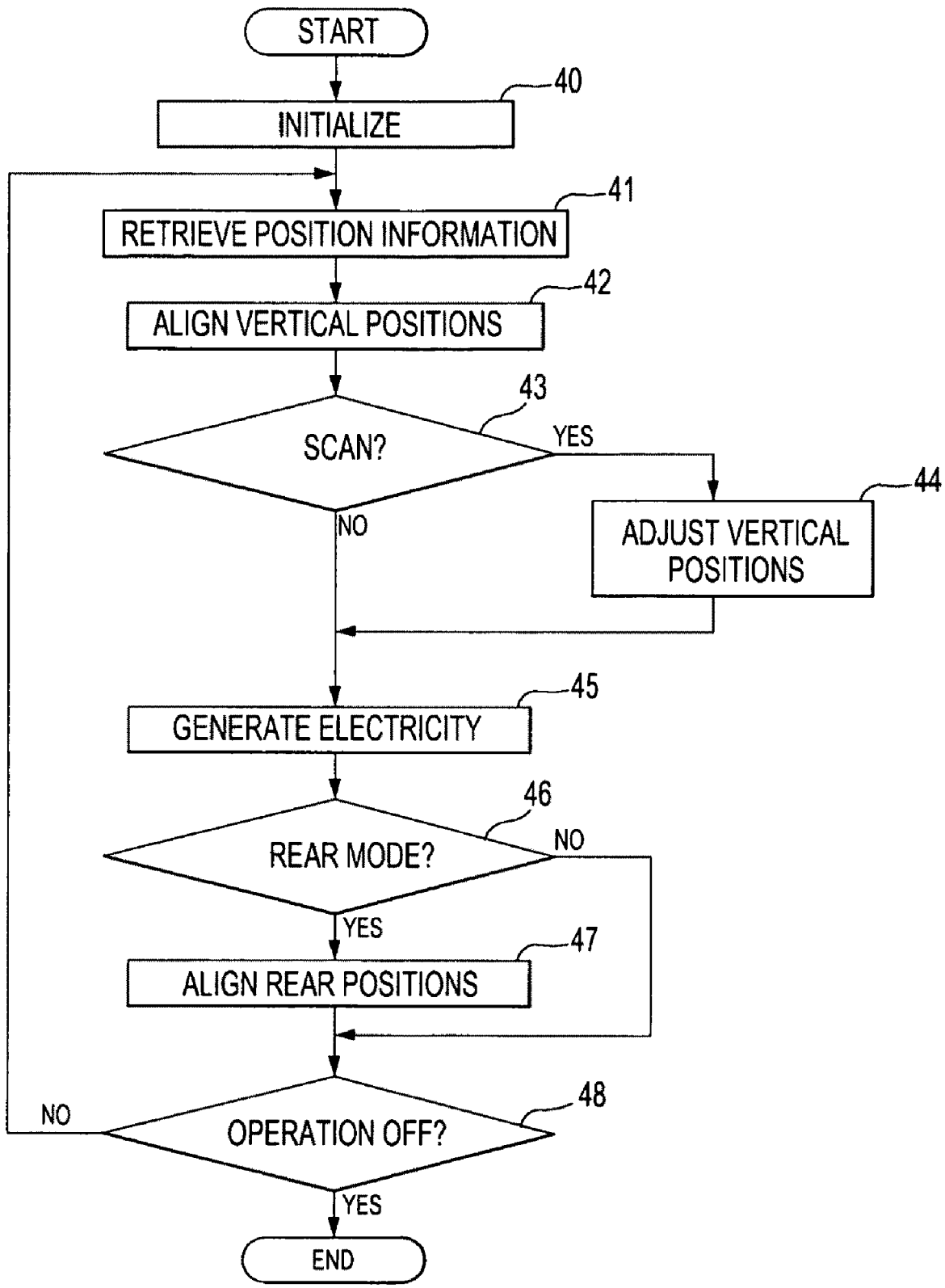
FIG. 6C is a flow chart illustrating a control method of the blind shown in FIG. 6A.

FIG. 6C is a flow chart illustrating a control method of the blind shown in FIG. 6A.

When power is supplied, the controller 180a controls an initialization operation to be performed according to an operation program (40). After the completion of the initialization operation, the controller 180a controls the motor drive part 230a based on position information provided from the storage unit 190 and the current time provided from a clock unit 191. As a result, the vertical positions of the vertical type blades 220 are aligned (41) (42). Subsequently, scanning is performed to finely adjust the aligned positions. The scanning is a process to move the blades to a position where the output of the optical sensor 223 is maximum (43) (44).

After the completion of the position adjustment, the solar batteries 222 generate electricity (45). When the vertical type blades rotate only in one direction to track sunlight, the solar batteries 222 are covered by the neighboring blades after the lapse of a predetermined time. For this reason, it is necessary to attach solar batteries to the front and rear of each vertical type blade such that the generation of electricity can be performed by selectively using the front solar battery and the rear solar battery.

Figure 7A:
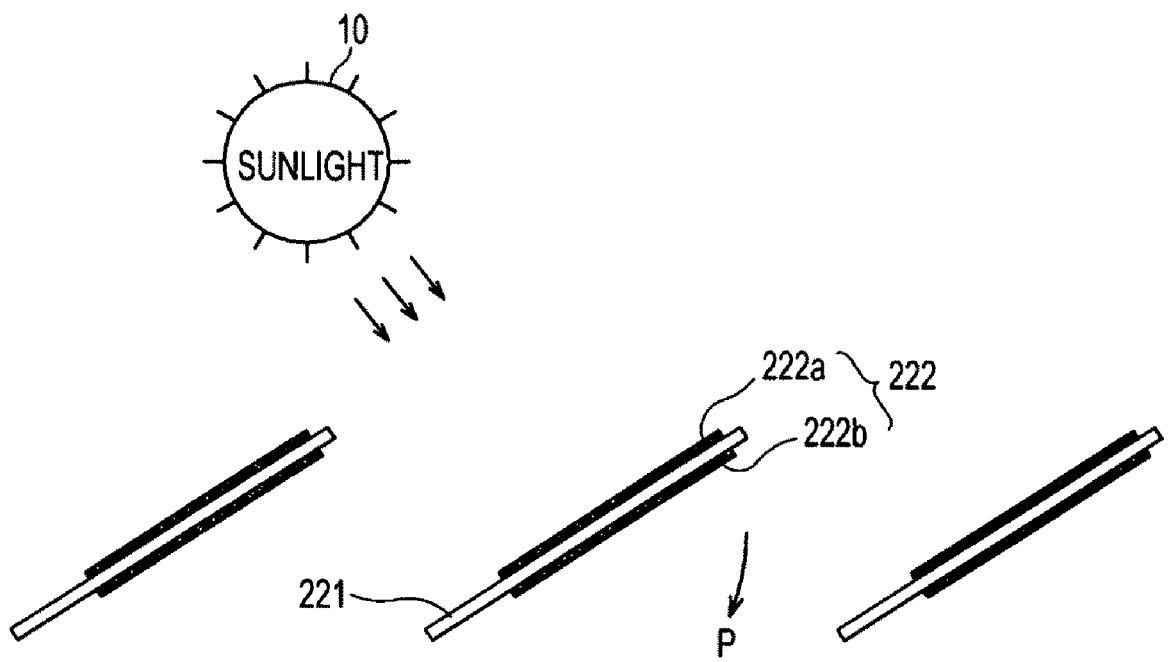

As shown in FIG. 7A, the solar batteries 222 are attached to the front and rear of each vertical type blade 221. When sunlight 10 is located at the left, the front solar battery 222a attached to the front of each plate 221 generates electricity. The vertical positions of the blades are adjusted in the direction indicated by an arrow P at predetermined time intervals.

Figure 7C:
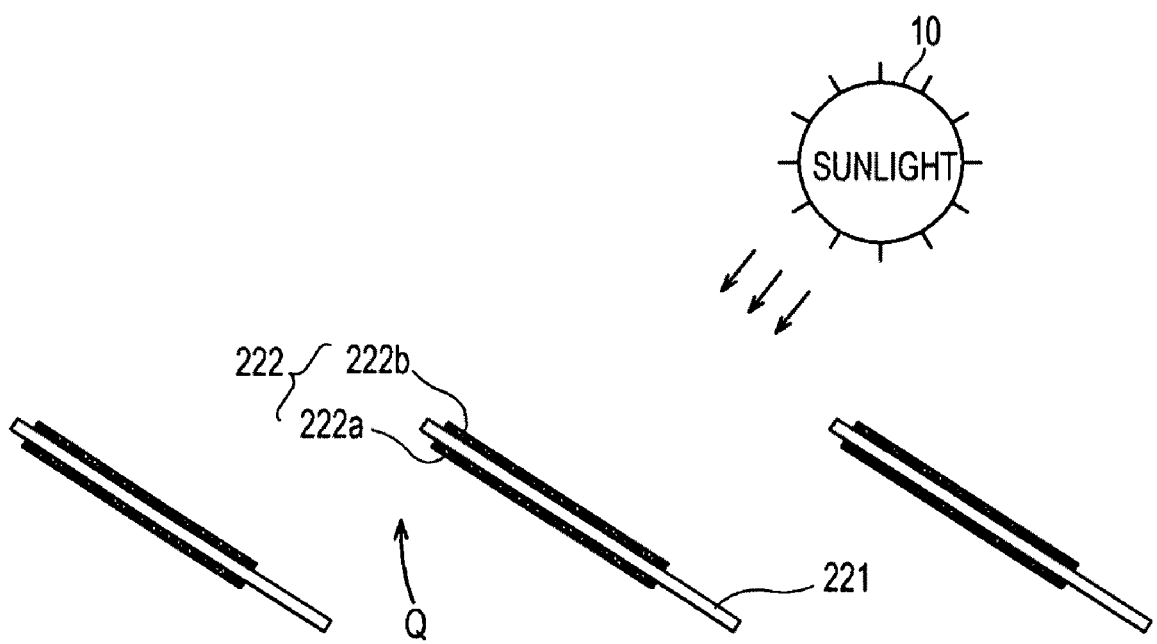

After a predetermined time, as shown in FIG. 7B, the blades are arranged in a line. Afterwards, the operation is performed at a rear mode. The rear mode is an operation mode in which the plates turn inside out, and the vertical positions of the plates are adjusted in the reverse direction. For example, as shown in FIG. 7C, the plates 221 are arranged such that the rear solar batteries 222b of the plates 221 face sunlight 10 located at the right, and vertical positions of the blades are adjusted in the direction indicated by an arrow Q at predetermined time intervals. At this time, the rear solar batteries 222b of the plates 221 generate electricity (46) (47).

The controller 180a determines whether the operation is off (48). When it is determined that the operation is off, the generation of electricity is interrupted, and the procedure ends. When it is determined that the operation is not off, the procedure returns to operation 41 to continue the solar photovoltaic power generation.

Figure 8A:
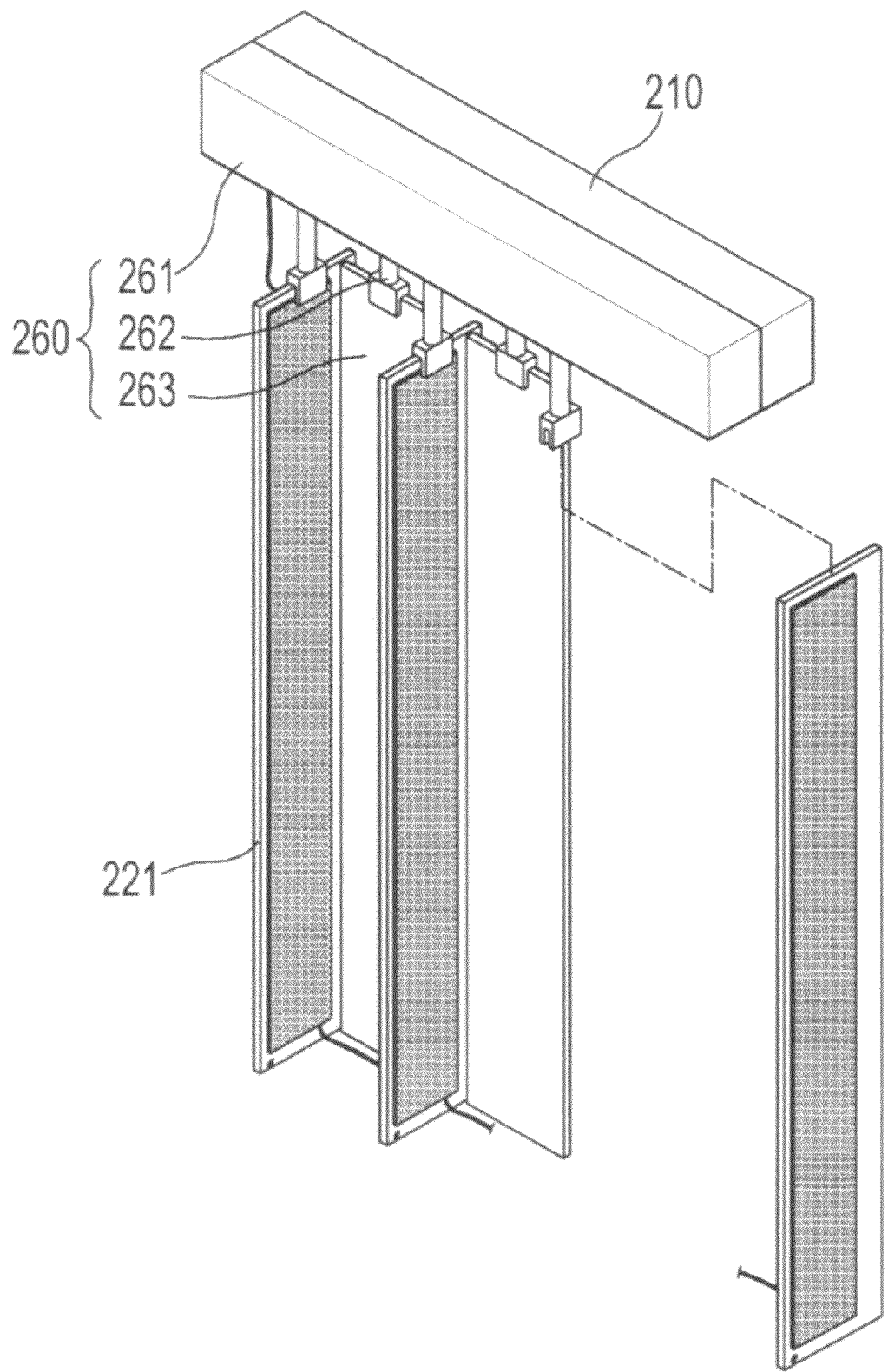
FIG. 8A is a view illustrating blocking units installed between blades of the vertical type blind of FIG. 6A.

FIG. 8A is a view illustrating blocking units 260 installed between the respective blades of the vertical type blind of FIG. 6A.

In this embodiment, the blocking units 260 are additionally included to further block light entering the room.

Each blocking unit 260 is located at the rear of the support unit 210. Each blocking unit 260 includes a support unit 261, a support bar 262, and a fixing plate 263. The support bar 262 fixes the fixing plate 263 to the support unit 261.

Figure 8B:
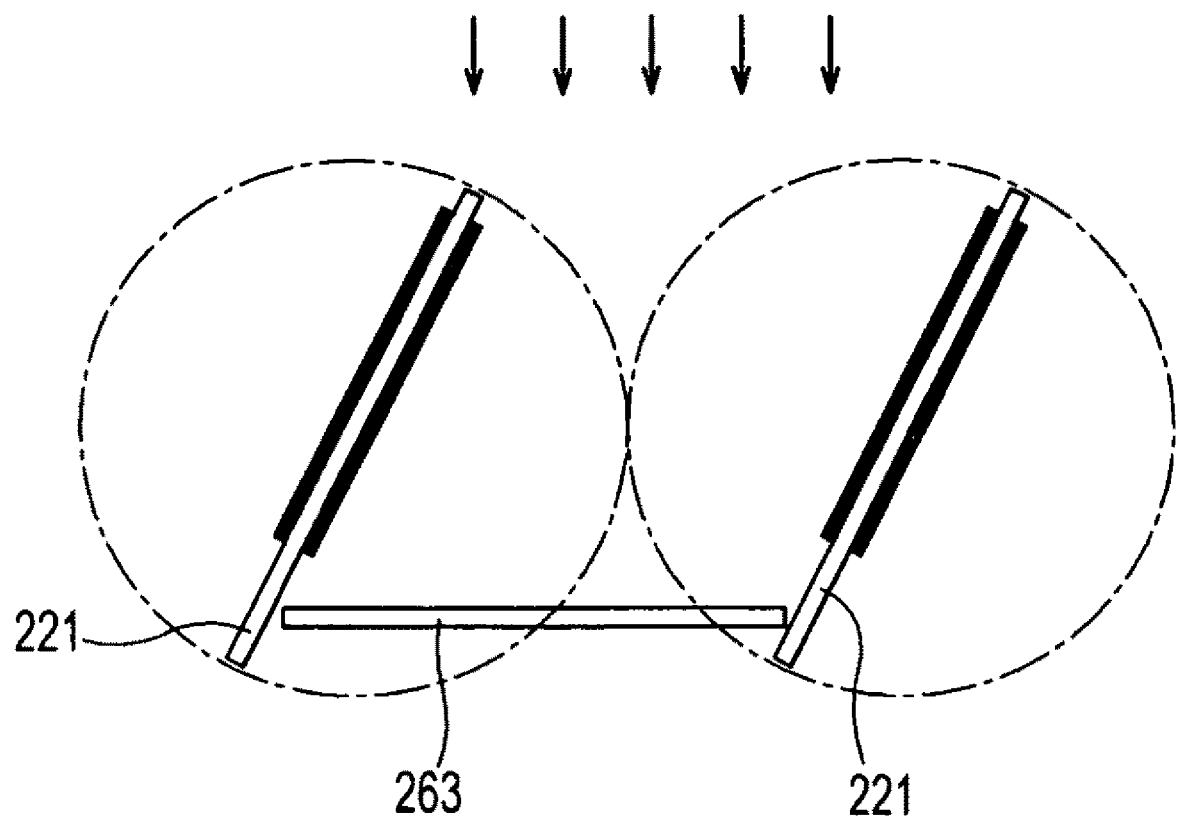
FIG. 8B is a view illustrating the operation of one of the blocking units of FIG. 8A.

As shown in FIG. 8B, the fixing plate 263 blocks light entering between the plates located forward to further reduce scattering light introduced into the room.

Figure 9A:
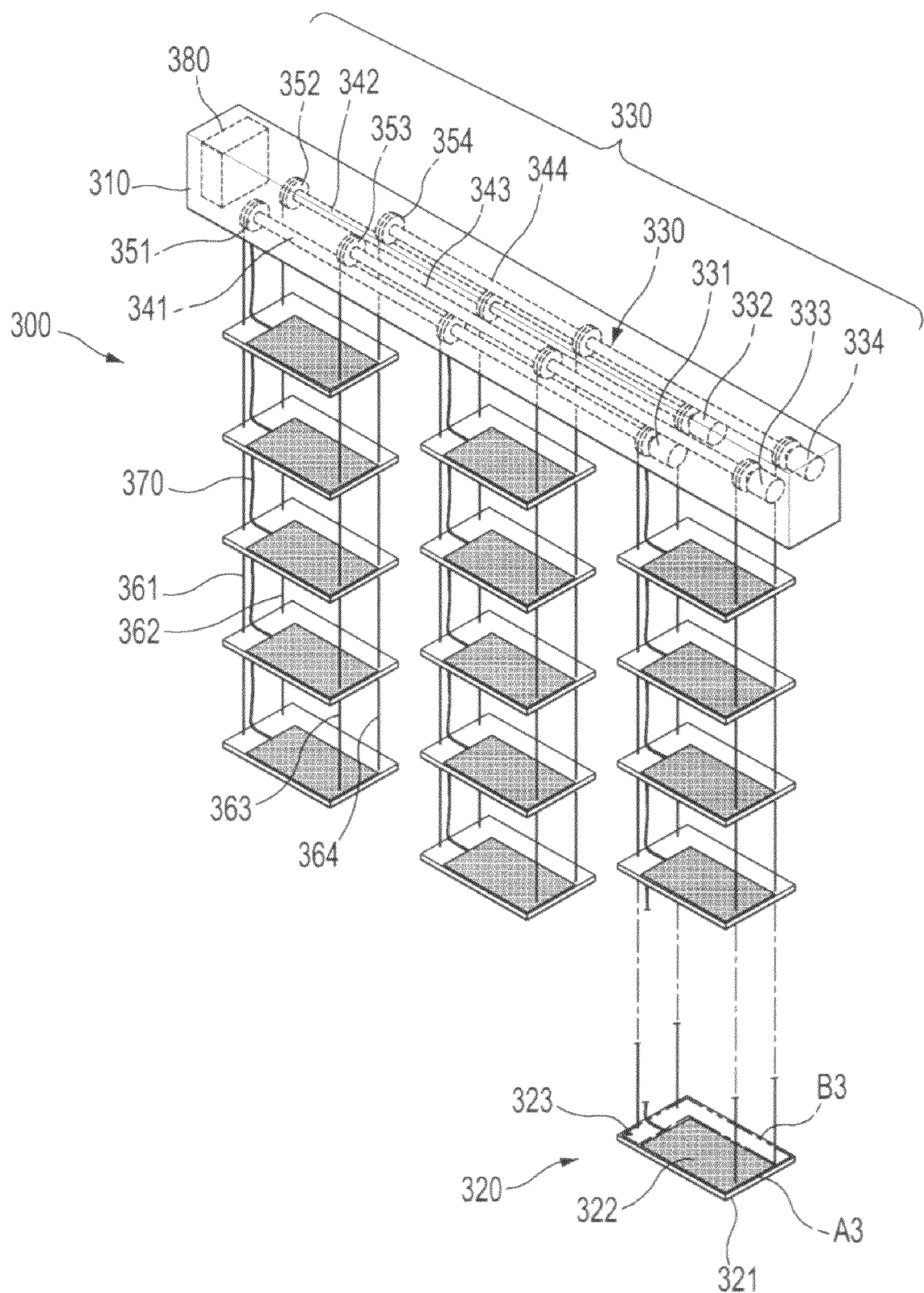
FIG. 9A is a perspective view illustrating the structure of a blind with solar batteries according to another embodiment of the present invention.

FIG. 9A is a perspective view illustrating the structure of a blind 300 with solar batteries according to another embodiment of the present invention.

In this embodiment, the blind 300 includes combination type blades 320 and a support unit 310 to support the blades 320.

Each blade 320 has a solar battery 322 attached to a plate 321. The solar battery 322 is attached to an attachment area A3 of the plate 321 but not to a non-attachment area B3 of the plate 321. A technical concept to attach the solar battery to only a portion of the plate considering that the solar battery 322 is covered by the neighboring blades is the same as in the previous embodiments.

In the support unit 310 are disposed a drive unit 330 and a control box 380.

The drive unit 330 includes a plurality of motors 331, 332, 333, and 334 configured to be independently driven and rotate in opposite directions. Rotary rods 341, 342, 343, and 344 are integrally coupled to shafts of the respective motors 331, 332, 333, and 334. Rotary rings 351, 352, 353, and 354 are coupled to the respective rotary rods. Adjustment strings 361, 362, 363, and 364 connect the respective rotary rings and the respective plates.

The motors 331, 332, 333, and 334 are individually or simultaneously driven. As the motors 331, 332, 333, and 334 are driven, the corresponding rotary rods and the corresponding rotary rings are rotated, with the result that the adjustment strings 361, 362, 363, and 364 connected to the respective plates are selectively or simultaneously pulled or loosened. Consequently, the horizontal and vertical positions of the respective plates are adjusted.

Reference numeral 323 indicates an optical sensor, and reference numeral 370 indicates a power cable.

Figure 9B:
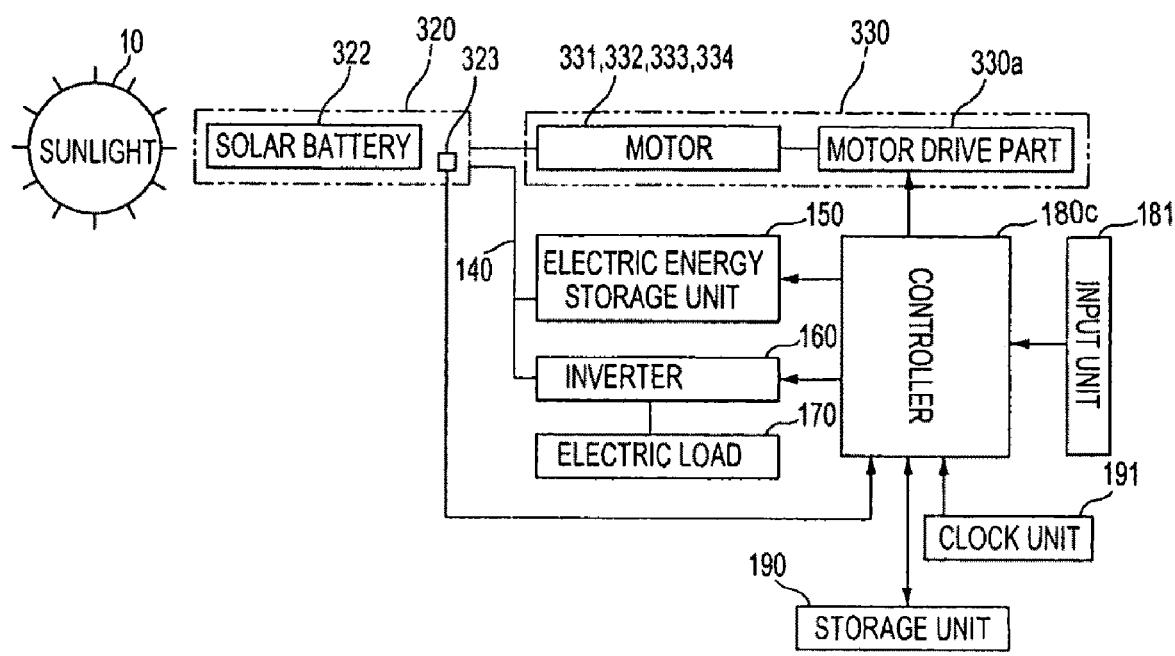
FIG. 9B is a control block diagram of the blind with solar batteries of FIG. 9A.

Referring to FIG. 9B, the blind according to this embodiment includes a controller 180c to control the generation of electricity using the solar batteries. Components of this embodiment identical to those of the previous embodiments are denoted by the same reference numerals, and will be described briefly.

The drive unit 330 includes the motors 331, 332, 333, and 334 configured to rotate in opposite directions and be independently driven and a motor drive part 330a. The motor drive part 330a rotates the motors in the forward direction or in the reverse direction according to the control of the controller 180c.

According to this embodiment, the controller 180c controls the blades 320 to be positioned in the horizontal direction such that the solar batteries 322 track sunlight to generate electricity using position information retrieved from a storage unit 190.

Figure 9C:
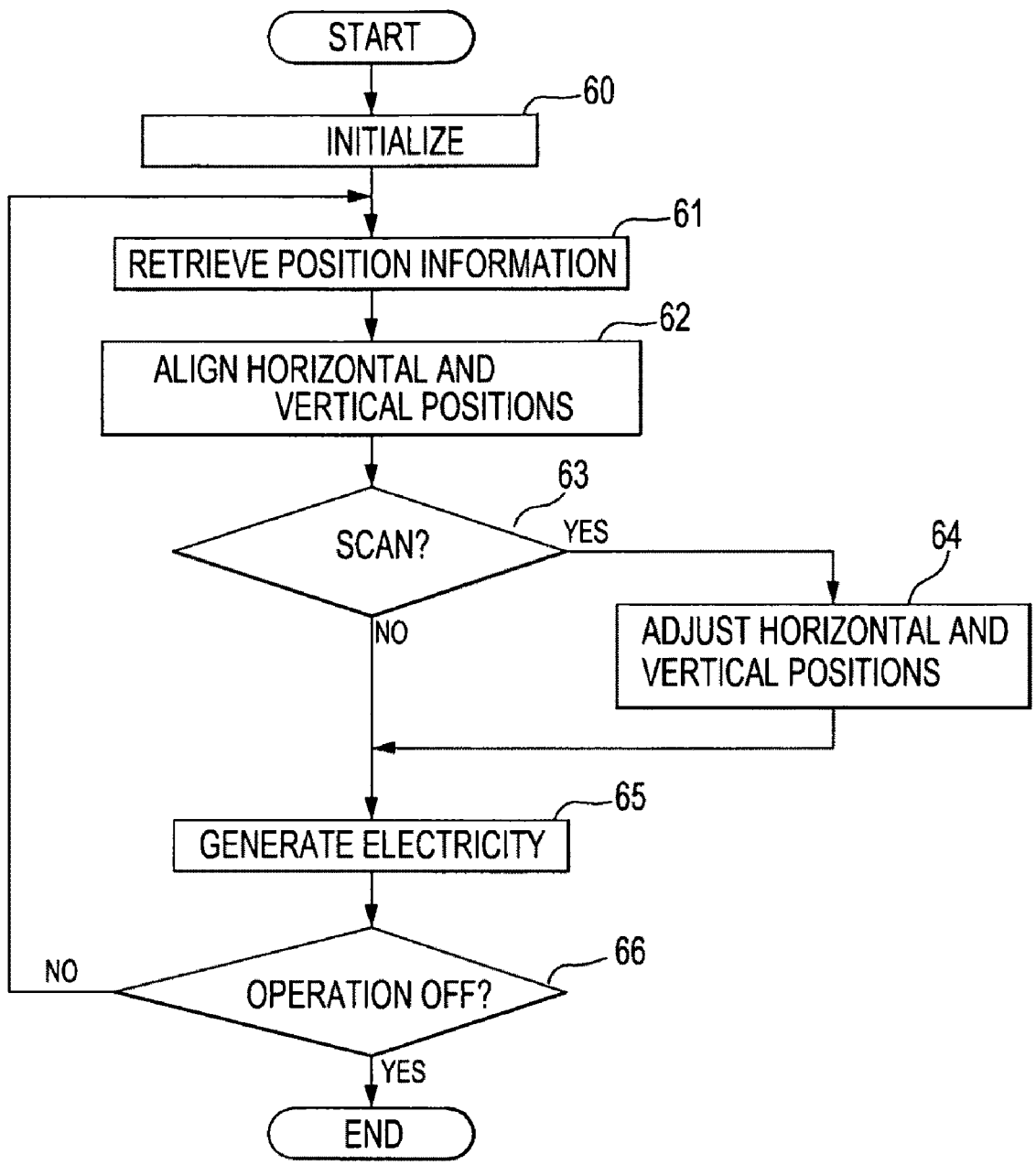
FIG. 9C is a flow chart illustrating a control method of the blind shown in FIG. 9A.

FIG. 9C is a flow chart illustrating a control method of the blind shown in FIG. 9A.

When power is supplied, the controller 180c controls an initialization operation to be performed according to an operation program (60). After the completion of the initialization operation, the controller 180c controls the motor drive part 330a based on position information provided from the storage unit 190 and the current time provided from a clock unit 191. As a result, the horizontal and vertical positions of the combination type blades 320 are aligned (61) (62). Subsequently, scanning is performed to finely adjust the aligned positions. The scanning is a process to move the blades to a position where the output of the optical sensor 323 is maximum (63) (64).

After the completion of the position adjustment, the solar batteries 322 generate electricity (65). The controller 180c determines whether the operation is off (66). When it is determined that the operation is off, the generation of electricity is interrupted, and the procedure ends. When it is determined that the operation is not off, the procedure returns to operation 61 to continue the solar photovoltaic power generation.

Figure 10A:
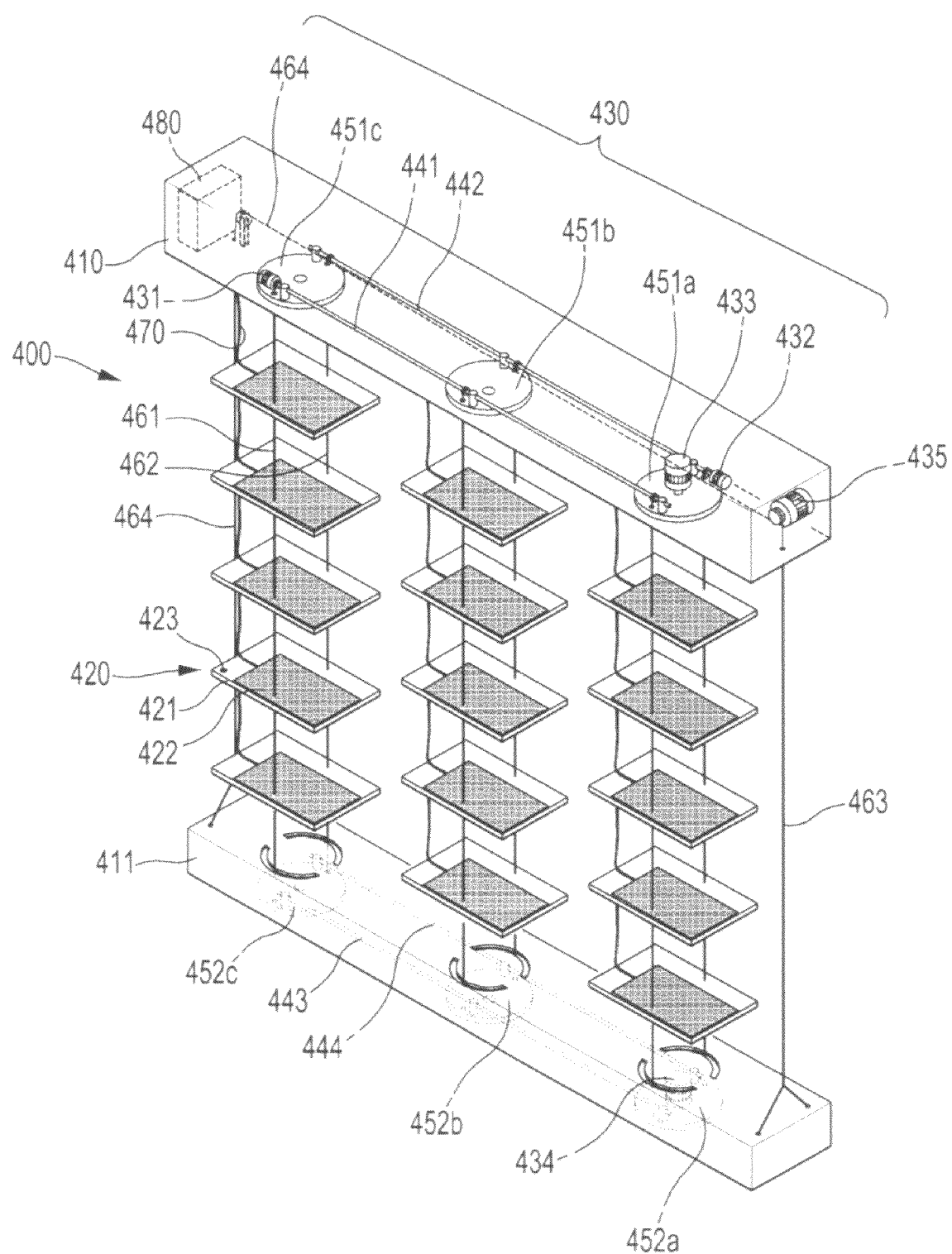
FIG. 10A is a perspective view illustrating the structure of a blind with solar batteries according to a further embodiment of the present invention.

FIG. 10A is a perspective view illustrating the structure of a blind 400 with solar batteries according to a further embodiment of the present invention.

In this embodiment, the blind 400 includes combination type blades 420 and an upper support unit 410 and a lower support unit 411 to support the blades 420.

Each blade 420 has a solar battery 422 attached to a plate 421. The solar battery 422 is attached to only a portion of the plate 421 but not to the remaining portion of the plate 421. A technical concept to attach the solar battery to only a portion of the plate considering that the solar battery 422 is covered by the neighboring blades is the same as in the previous embodiments.

In the support unit 410 are disposed a drive unit 430 and a control box 480.

The drive unit 430 includes a plurality of motors 431, 432, 433, 434, and 435 configured to rotate in opposite directions and be independently driven, rotary discs 451a, 451b, 451c, 452a, 452b, and 452c, and rotary rods 441, 442, 443, and 444.

The rotary rods 441 and 442 are connected to rotary shafts of the respective upper motors 431 and 432 located in the upper support unit 410. Adjustment strings 461 and 462 connected to opposite sides of the respective plates are wound on the respective rotary rods 441 and 442.

According to the rotation direction of the upper horizontal motors 431 and 432, the adjustment strings 461 and 462 are wound or unwound, with the result that the horizontal positions of the respective plates are adjusted.

Figure 11A:
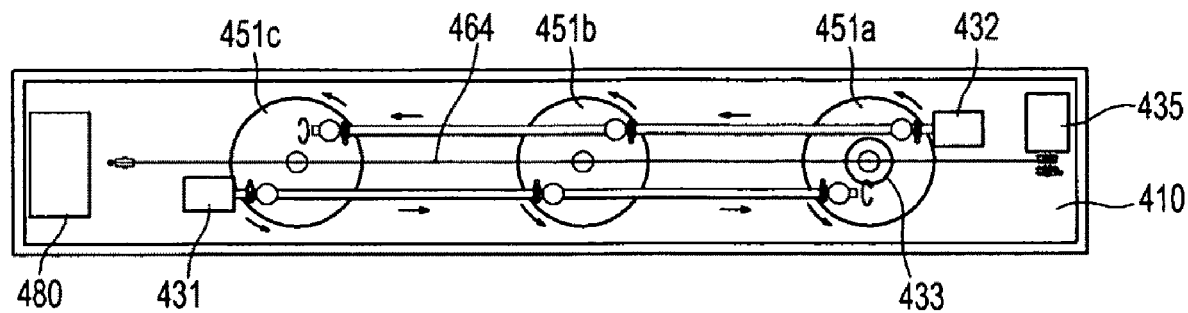
FIGS. 11A and 11B are views illustrating the operation of a drive unit of FIG. 10A.
Figure 11B:
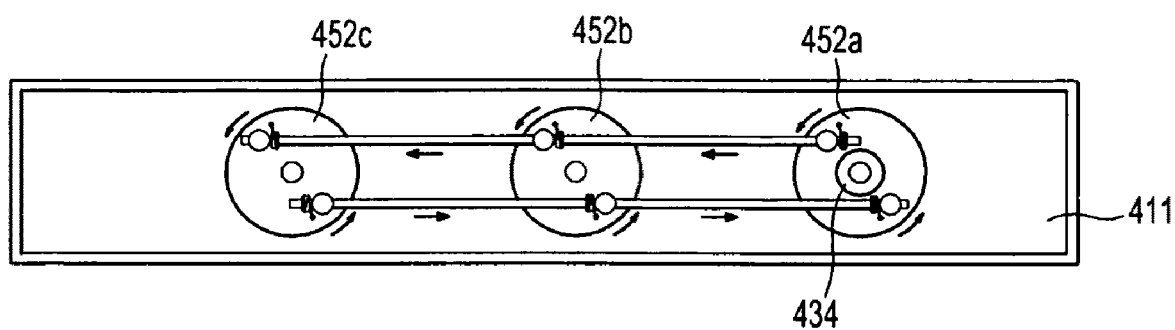

As shown in FIGS. 11A and 11B, the upper rotary discs 451a, 451b, and 451c are connected to one another via the rotary rods 441 and 442. The upper rotary discs 451a, 451b, and 451c are simultaneously rotated by the upper vertical motor 433 installed at the rotary disc 451a. The lower rotary discs 452a, 452b, and 452c are connected to one another via the rotary rods 443 and 444. The lower rotary discs 452a, 452b, and 452c are simultaneously rotated by the lower vertical motor 434 installed at the rotary disc 452a.

The upper vertical motor 433 and the lower vertical motor 434 are driven in response to each other. The upper rotary discs and the lower rotary discs are rotated in the same directions such that the adjustment strings 461 and 462 connected to the plates are not twisted.

In the upper support unit 410 is disposed a lighting motor 435.

Figure 11C:
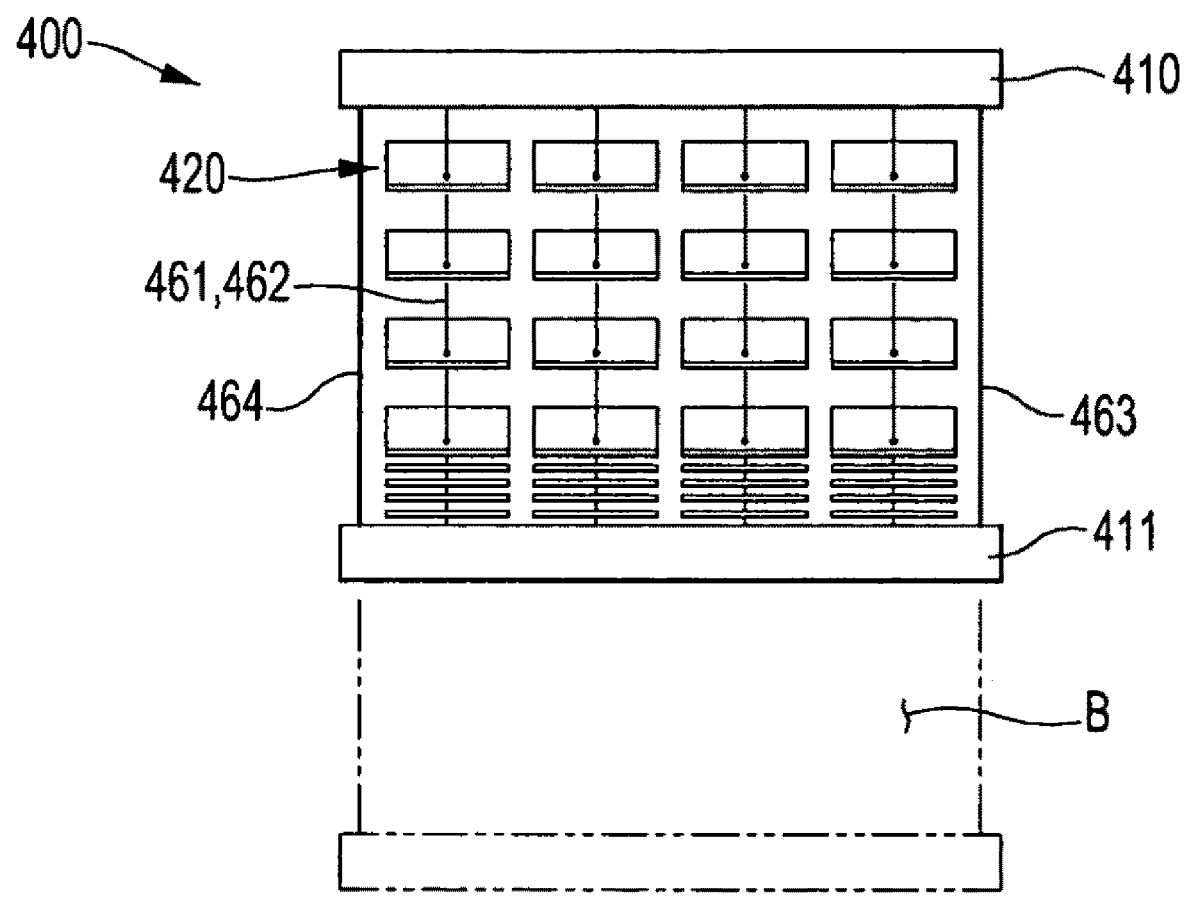
FIG. 11C is a view illustrating some blades folded by lifting a lower support unit using a lighting motor shown in FIG. 10A.

The lighting motor 435 simultaneously winds or unwinds an adjustment string 463 (FIG. 11C) connected to one side of the lower support unit 411 and an adjustment string 464 connected to the other side of the lower support unit 411 to perform a lighting function. For example, as shown in FIG. 11C, the lighting motor 435 is used to generate electricity while the blind 400 partially occupies a window. The lighting motor 435 is driven to widen an area B through which light enters the room or secure a visual field.

Reference numeral 423 indicates an optical sensor, and reference numeral 470 indicates a power cable.

Figure 10B:
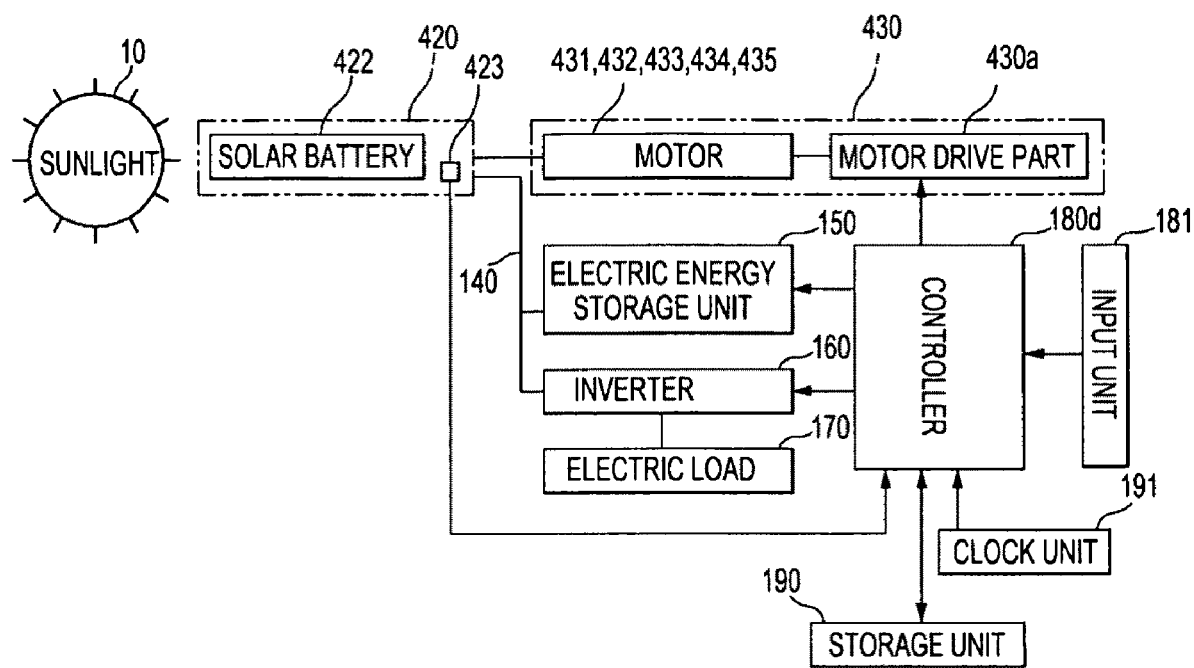
FIG. 10B is a control block diagram of the blind with solar batteries of FIG. 10A.

Referring to FIG. 10B, the blind according to this embodiment includes a controller 180d to control the generation of electricity using the solar batteries. Components of this embodiment identical to those of the previous embodiments are denoted by the same reference numerals, and will be described briefly.

The drive unit 430 includes the motors 431, 432, 433, 434, and 435 configured to rotate in opposite directions and to be independently driven and a motor drive part 430a. The motor drive part 430a rotates the motors in the forward direction or in the reverse direction according to the control of the controller 180d.

According to this embodiment, the controller 180d controls the combination type blades 420 to be positioned in the horizontal and vertical directions such that the solar batteries 422 track sunlight to generate electricity using position information retrieved from a storage unit 190.

Figure 10C:
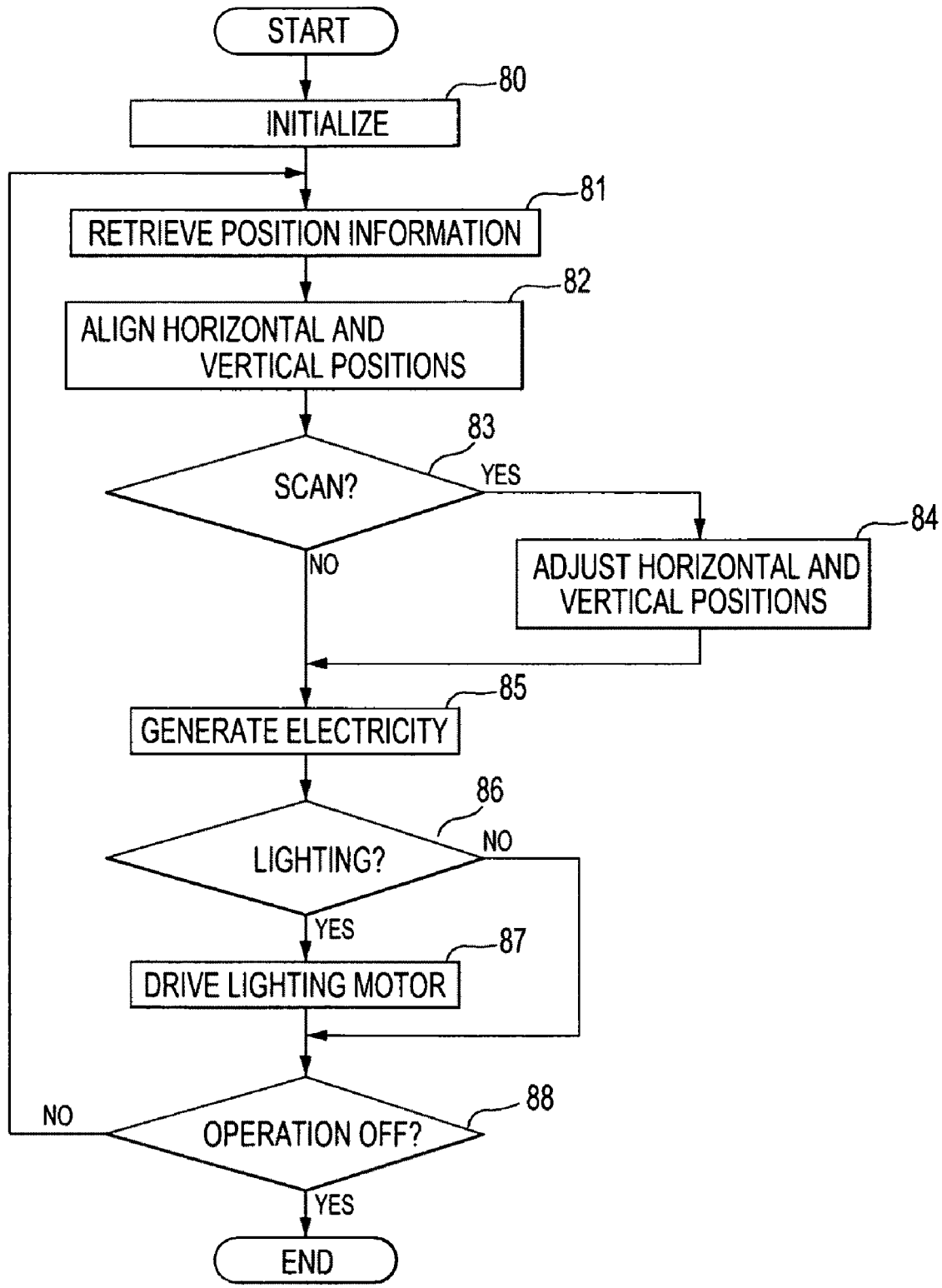
FIG. 10C is a flow chart illustrating a control method of the blind shown in FIG. 10A.

FIG. 10C is a flow chart illustrating a control method of the blind shown in FIG. 10A.

When power is supplied, the controller 180d controls an initialization operation to be performed according to an operation program (80). After the completion of the initialization operation, the controller 180d controls the motor drive part 430a based on position information provided from the storage unit 190 and the current time provided from a clock unit 191. As a result, the horizontal and vertical positions of the combination type blades 420 are aligned (81) (82). Subsequently, scanning is performed to finely adjust the aligned positions. The scanning is a process to move the blades to a position where the output of the optical sensor 423 is maximum (83) (84). After the completion of the position adjustment, the solar batteries 422 generate electricity (85).

The controller 180d determines whether a lighting signal has been inputted through an input unit 181. When it is determined that the lighting signal has been inputted, the controller 180d controls the lighting motor 435 to be driven. As the lighting motor 435 is driven, the lower support unit 411 moves upward, with the result that some of the blades are folded. Consequently, light is let in light through the predetermined area B of the window (86) (87).

The controller 180d determines whether the operation is off (88). When it is determined that the operation is off, the generation of electricity is interrupted, and the procedure ends. When it is determined that the operation is not off, the procedure returns to operation 81 to continue the solar photovoltaic power generation.

As is apparent from the above description, the solar batteries partially attached to the respective blades track sunlight to generate electricity. Consequently, the present invention has the effect of increasing the efficiency of the electricity generation and reducing an economic burden.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A blind, comprising:
   a plurality of blades configured to be adjusted in their respective positions;
   a plurality of solar batteries, respectively attached to each of the blades;
   a clock unit to provide current time information;
   a drive unit to drive the blades;
   a storage unit to store position information of the blades;
   a controller to control the drive unit to initially adjust the position of the blades based on the position information and the current time information, and
   at least one optical sensor installed at the blades to provide an output value corresponding to an intensity of light,
   wherein the controller controls the drive unit to perform a scanning process to move the blades to a position where the solar batteries are available to generate electricity to finely adjust the initially adjusted positions of the blades.

2. The blind according to claim 1, wherein the solar batteries are installed at an installation position of each respective blade, when an inclination of the blade is located at meridian altitude, so that the entire area of the solar batteries is available to generate electricity, the position being adjacent to a part of the blade where light is blocked by a neighboring one of the blades.

3. The blind according to claim 1, further comprising a plurality of optical sensors respectively installed at each of the blades.

4. The blind according to claim 1, wherein the drive unit comprises a motor and a connection member operatively connected to the motor to move the respective blades.

5. A blind, comprising:
   a plurality of blades, each of the blades having a horizontally adjustable position, each of the blades having a solar battery attached thereto;
   a clock unit to provide current time information;
   a drive unit to adjust the horizontal positions of the blades;
   a storage unit to store position information to adjust the horizontal positions of the blades;

a controller to control the drive unit such that the solar batteries track sunlight, and at least one optical sensor installed at the blades to provide an output value corresponding to an intensity of light, wherein the controller to control the drive unit to initially adjust the horizontal positions of the blades based on the position information and the current time information, and wherein the controller controls the drive unit to perform a scanning process to move the blades to a position where the solar batteries are available to generate electricity to finely adjust the initially adjusted horizontal positions of the blades.

6. The blind according to claim 5, wherein the solar batteries are respectively installed at an installation position of each respective blade when an inclination of the blade is located at meridian altitude, so that the entire area of the solar batteries is available to generate electricity, the position being adjacent a part of the blade where light is blocked by a neighboring one of the blades.

7. The blind according to claim 5, further comprising a plurality of optical sensors respectively installed at each of the blades, wherein, when generation of electricity using the sunlight is not possible, the controller controls the horizontal position of each blade to be adjusted such that the solar battery attached to one side of each blade is directed to an indoor light source, and wherein the controller to control the drive unit to adjust the horizontal positions of the blades based on an output of the optical sensor so that the side of each blade where the solar battery is attached faces the indoor light source.

8. A blind, comprising:

a plurality of blades, each of the blades having a vertically adjustable position, each of the blades having a solar battery attached thereto;

a clock unit to provide current time information;

a drive unit to adjust the vertical positions of the blades;

a storage unit to store position information to adjust the vertical positions of the blades;

a controller to control the drive unit such that the solar batteries track sunlight, and at least one optical sensor installed at the blades to provide an output value corresponding to an intensity of the light, wherein the controller to control the drive unit to initially adjust the horizontal positions of the blades based on the position information and the current time information, and wherein the controller controls the drive unit to perform a scanning process to move the blades to a position where the solar batteries are available to generate electricity to finely adjust the initially adjusted horizontal positions of the blades.

9. The blind according to claim 8, wherein the solar battery is installed at an installation position of each of the blades, when an inclination of the blade is located at meridian altitude, so that the entire area of the solar battery is available to generate electricity, the position being adjacent to a part of the blade where light is blocked by a neighboring one of the blades.

10. The blind according to claim 9, wherein the solar battery is installed at each side of each of the blades.

11. The blind according to claim 8, further comprising a plurality of blocking units to block light entering between the respective blades.

12. A blind with solar batteries, comprising:

a plurality of blades, each of the blades having a horizontally and vertically adjustable position, each of the blades having a solar battery attached thereto;

a clock unit to provide current time information;

a drive unit to adjust the horizontal and vertical positions of the blades;

a storage unit to store position information to adjust the horizontal and vertical positions of the blades;

a controller to control the drive unit such that the solar batteries track sunlight, and at least one optical sensor installed at the blades to provide an output value corresponding to an intensity of light, wherein the controller to control the horizontal and vertical positions of the blades based on the position information and the current time information, and wherein the controller controls the drive unit to perform a scanning process to move the blades to a position where the solar batteries are available to generate electricity to finely adjust the horizontal and vertical positions of the blades.

13. The blind according to claim 12, wherein the drive unit comprises a plurality of motors to adjust the horizontal and vertical positions of the blades, each of the motors being individually driven.

14. The blind according to claim 12, further comprising:

a support unit to support one side of each of the blades; and a lighting motor to drive the support unit to fold at least one of the blades.

15. A control method of a blind, comprising:

getting current time information;

retrieving position information of a plurality of blades necessary for the blades configured to be adjusted in their horizontal or vertical positions, each blade having a solar battery attached thereto, to track sunlight;

initially adjusting the horizontal or vertical positions of the blades based on the retrieved position information of the blades and the current time information, and performing a scanning process to move the blades to a position where the solar batteries are available to generate electricity to finely adjust the initially adjusted horizontal or vertical positions of the blades.

16. The control method according to claim 15, further comprising sensing intensity of light provided by an optical sensor, and, when generation of electricity using the sunlight is not possible, adjusting the horizontal or vertical positions of the blades such that the solar batteries attached to the blades are directed to an indoor illumination, wherein the adjusting the horizontal or vertical positions of the blades comprises adjusting the blades based on an output of the optical sensor so that the side of each blade where the solar battery is attached is positioned to face the indoor illumination.

17. The control method according to claim 15, further comprising:

when the blades are configured to be adjusted in their vertical positions, attaching solar batteries to front and rear sides of each of the blades; and when adjusting the positions of the blades, controlling the front solar battery and the rear solar battery to track the sunlight in order.

18. The control method according to claim 15, further comprising folding some of the blades to let in light.

* * * * *

UNITED STATES PATENT AND TRADEMARK OFFICE
CERTIFICATE OF CORRECTION

PATENT NO. : 8,365,800 B2
APPLICATION NO. : 12/591314
DATED : February 5, 2013
INVENTOR(S) : Jae Hyuk Oh et al.

Page 1 of 1

It is certified that error appears in the above-identified patent and that said Letters Patent is hereby corrected as shown below:

In the Claims:

Column 12, Line 3, In Claim 12, delete "position ," and insert -- position, --, therefor.

Signed and Sealed this
Twenty-eighth Day of May, 2013

Teresa Stanek Rea
*Acting Director of the United States Patent and Trademark Office*